(12) United States Patent
Kobayashi

(10) Patent No.: US 9,511,517 B2
(45) Date of Patent: Dec. 6, 2016

(54) COMPOSITE OPTICAL ELEMENT AND PROCESS FOR PRODUCTION THEREOF, AND IMAGING DEVICE AND OPTICAL RECORDING/REPRODUCTION DEVICE EACH EQUIPPED WITH THE COMPOSITE OPTICAL ELEMENT

(75) Inventor: Nobuyuki Kobayashi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1244 days.

(21) Appl. No.: 13/382,083

(22) PCT Filed: Jul. 13, 2010

(86) PCT No.: PCT/JP2010/004541
§ 371 (c)(1),
(2), (4) Date: Jan. 3, 2012

(87) PCT Pub. No.: WO2011/007557
PCT Pub. Date: Jan. 20, 2011

(65) Prior Publication Data
US 2012/0100344 A1    Apr. 26, 2012

(30) Foreign Application Priority Data

Jul. 16, 2009   (JP) ................ 2009-167400

(51) Int. Cl.
*B29C 41/36* (2006.01)
*B29C 41/00* (2006.01)
(Continued)

(52) U.S. Cl.
CPC ............. *B29C 41/36* (2013.01); *B29C 41/003* (2013.01); *B29C 41/12* (2013.01); *C09D 4/00* (2013.01);
(Continued)

(58) Field of Classification Search
CPC .. B31F 1/07; C08F 299/028; G11B 7/24018; G11B 7/24062; B29L 2011/0016; G02B 1/04; G02B 1/041; G02B 3/04; Y10T 428/24479; Y10T 428/26; Y10T 428/31511
USPC ................ 427/162; 428/156, 332, 413, 500; 525/55, 242, 910; 526/261
See application file for complete search history.

(56) References Cited

U.S. PATENT DOCUMENTS 4,168,900 A * 9/1979 Adachi ................ G02B 3/0012 355/1
4,756,600 A * 7/1988 Ramsay ................ G02B 6/443 385/102

(Continued)

FOREIGN PATENT DOCUMENTS

JP     8-269147     10/1996
JP     9-235338     9/1997
(Continued)

OTHER PUBLICATIONS

Goodall, B.L. "Cyclialiphatic Polymers", Dec. 2001, Elsevier, Encyclopedia of Materials—Science and Technology, p. 1959-1962.*

(Continued)

*Primary Examiner* — Maria Veronica Ewald
*Assistant Examiner* — Ethan Weydemeyer
(74) *Attorney, Agent, or Firm* — Hamre, Schumann, Mueller & Larson, P.C.

(57) ABSTRACT

The present invention provides a composite optical element including a resin layer that is less susceptible to yellowing and has small cure shrinkage during formation. The present invention is a composite optical element including a resin layer obtained by polymerizing a resin composition containing a (meth)acrylate compound of a saturated aliphatic epoxy compound, a multifunctional isocyanurate compound, and a photopolymerization initiator.

13 Claims, 1 Drawing Sheet

(51) Int. Cl.
  *B29C 41/12* (2006.01)
  *C09D 4/00* (2006.01)
  *G02B 1/04* (2006.01)
  *G02B 3/04* (2006.01)
  *B29L 11/00* (2006.01)

(52) U.S. Cl.
  CPC ............... *G02B 1/04* (2013.01); *G02B 1/041* (2013.01); *G02B 3/04* (2013.01); *B29L 2011/0016* (2013.01); *Y10T 428/24479* (2015.01); *Y10T 428/26* (2015.01); *Y10T 428/31511* (2015.04)

(56) References Cited

U.S. PATENT DOCUMENTS

| | | | | |
|---|---|---|---|---|
| 5,290,663 | A | * | 3/1994 | Huynh-Tran ......... C08G 18/638 430/270.1 |
| 5,376,431 | A | * | 12/1994 | Rowland ............... C23C 14/205 359/536 |
| 6,075,652 | A | * | 6/2000 | Ono ......................... G02B 1/11 257/E31.127 |
| 6,322,932 | B1 | * | 11/2001 | Colvin ...................... G03H 1/02 359/1 |
| 7,901,787 | B2 | | 3/2011 | Miyakawa |
| 2005/0014088 | A1 | | 1/2005 | Nakamura et al. |
| 2005/0118430 | A1 | | 6/2005 | Doi et al. |
| 2006/0012889 | A1 | | 1/2006 | Kojima et al. |
| 2007/0003730 | A1 | * | 1/2007 | Kojima .................. G11B 7/266 428/64.4 |
| 2008/0085985 | A1 | * | 4/2008 | Nakamura ............. C08L 63/00 528/25 |
| 2008/0102279 | A1 | * | 5/2008 | Ito ............................ C07F 5/027 428/409 |
| 2008/0251741 | A1 | * | 10/2008 | Yanagita et al. ............... 250/584 |
| 2009/0099326 | A1 | * | 4/2009 | Okada .................... C07C 31/44 526/242 |

FOREIGN PATENT DOCUMENTS

| | | | | |
|---|---|---|---|---|
| JP | 10-058550 | | 3/1998 | |
| JP | 2000-281725 | | 10/2000 | |
| JP | 2002-138131 | | 5/2002 | |
| JP | 2004217780 | A * | 8/2004 | ............. C08G 59/26 |
| JP | 2005-060696 | | 3/2005 | |
| JP | 2006-251017 | | 9/2006 | |
| JP | 2006-251024 | | 9/2006 | |
| JP | WO 2007125829 | A1 * | 11/2007 | ............. C07C 31/44 |
| JP | 2009-079225 | | 4/2009 | |
| JP | 2009113433 | A * | 5/2009 | ............. B32B 27/28 |
| WO | WO2007/125829 | A1 * | 11/2007 | ............. C07C 69/653 |
| WO | 2009/038134 | | 3/2009 | |

OTHER PUBLICATIONS

Goodall, B.L. "Cyclialiphatic Polymers", Dec. 2001, Elsevier, Enciclopedia of Materials—Science and Technology, p. 1959-1962.*

* cited by examiner

COMPOSITE OPTICAL ELEMENT AND PROCESS FOR PRODUCTION THEREOF, AND IMAGING DEVICE AND OPTICAL RECORDING/REPRODUCTION DEVICE EACH EQUIPPED WITH THE COMPOSITE OPTICAL ELEMENT

TECHNICAL FIELD

The present invention relates to a composite optical element in which a resin layer is formed on a surface of an optical substrate, and a method for producing the composite optical element. The present invention also relates to an imaging device including the composite optical element, and an optical recording and reproducing device including the composite optical element.

BACKGROUND ART

A structure body obtained by joining, onto an optical substrate (hereinafter referred to as a lens substrate) made of a material such as glass, a layer made of a material (a resin, for example) different from the material of the lens substrate is generally called a composite optical element. Typical examples thereof include a composite optical element obtained by joining a resin layer onto a lens substrate with a surface of a spherical shape and forming a surface of the resin layer into an aspherical shape.

In the composite optical element, the resin layer is formed by curing through polymerization a resin composition on a surface of a lens substrate with an ultraviolet ray. However, there has been a problem in that since the shrinkage of the resin composition during the polymerization-curing is significant, a large distortion occurs in the resin layer and thus the resin layer separates easily from the lens substrate.

To deal with this problem, Patent Literature 1 discloses a composite optical element in which a resin layer obtained by curing through polymerization a resin composition containing aromatic epoxy(meth)acrylate is provided on a surface of a glass lens. The resin composition containing aromatic epoxy(meth)acrylate is said to have small cure shrinkage.

CITATION LIST

Patent Literature

PTL 1: JP 2002-138131 A

SUMMARY OF INVENTION

Technical Problem

However, the composite optical element described in Patent Literature 1 has a problem in that it is susceptible to yellowing during production and use.

Under this circumstance, the present invention is intended to provide a composite optical element including a resin layer that is less susceptible to yellowing and has small cure shrinkage during formation. The present invention is also intended to provide a method for producing a composite optical element in which a resin composition has small cure shrinkage during formation of a resin layer and the resin layer is less susceptible to yellowing.

Solution to Problem

The present invention that has accomplished the above-mentioned objects is a composite optical element including a resin layer obtained by polymerizing a resin composition containing a (meth)acrylate compound of a saturated aliphatic epoxy compound, a multifunctional isocyanurate compound, and a photopolymerization initiator.

The present invention is also a method for producing a composite optical element, including the steps of preparing a resin composition containing a (meth)acrylate compound of a saturated aliphatic epoxy compound, a multifunctional isocyanurate compound, and a photopolymerization initiator; and curing through polymerization the resin composition on a surface of an optical substrate.

Advantageous Effects of Invention

According to the present invention, the resin composition has small cure shrinkage during formation of the resin layer in the production of the composite optical element, and the resin layer is less susceptible to yellowing. This makes it possible to increase the yield of the composite optical element in the production, and to enhance both of the short-term reliability of the composite optical element during production and the long-term reliability of the composite optical element after production, with which yellowing is associated.

DESCRIPTION OF EMBODIMENTS

Hereinafter, embodiments of the present invention will be described with reference to the drawings.

Embodiment 1

1. Composite Optical Element

Figure 1:
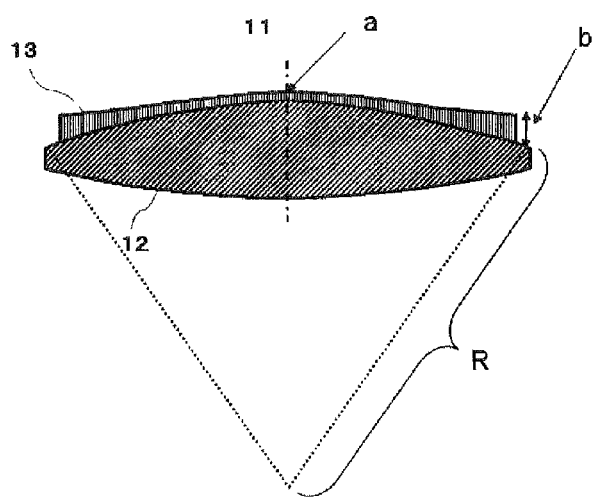
FIG. 1 is a cross-sectional view of a composite optical element of Embodiment 1 according to the present invention.

FIG. 1 is a cross-sectional view of a composite optical element of Embodiment 1. The dashed-dotted line in FIG. 1 indicates an optical axis of a composite optical element 11. The composite optical element 11 has the shape of a rotating body formed by rotating, about the optical axis, the shape of the cross-sectional view in FIG. 1. As shown in FIG. 1, the composite optical element 11 includes a resin layer 13, and an optical substrate (lens substrate) 12 with the resin layer 13 being formed on an upper surface thereof. The lens substrate 12 can be formed of a material such as glass, quartz and ceramics. The resin layer 13 is formed on the surface of the lens substrate 12 by curing through polymerization the after-mentioned resin composition. In Embodiment 1, both surfaces of the lens substrate are convex, but one or both of the surfaces may be concave. Moreover, the resin layer may be formed on both surfaces of the lens substrate.

With any of the shapes, it is preferable that the lens substrate 12 has a thickness of at least 1 mm but not more than 30 mm, and the surface of the lens substrate 12 onto which the resin layer 13 is joined has a curvature radius R of at least 3 mm but not more than 100 mm.

Preferably, the resin layer has a thickness of at least 50 μm but not more than 2000 μm. A thickness out of this range may reduce the strength of the resin layer and the polymerization curability (formability) of the resin composition.

Moreover, it is preferable that the thickness of the resin layer varies with location within the above-mentioned thickness range. By allowing the thickness of the resin layer to vary with location, it is possible to fabricate, for example, an aspheric lens in which the aspherical resin layer 13 is provided on the lens substrate 12 with a spherical surface.

2. Resin Layer

2-1. Composition of Resin Composition

The resin layer obtained by polymerizing a resin composition containing a (meth)acrylate compound of a saturated aliphatic epoxy compound, a multifunctional isocyanurate compound, and a photopolymerization initiator has a smaller cure shrinkage during formation of the resin layer than that of a conventional resin layer obtained by polymerizing a resin composition containing aromatic epoxy(meth)acrylate. Moreover, although the aromatic epoxy(meth)acrylate is susceptible to yellowing, it is possible to reduce the yellowing-derived deterioration by replacing the aromatic ring, which is considered to be a primary cause of the yellowing, with a saturated aliphatic chain. Accordingly, it is possible to enhance not only the reliability of the resin layer but also the reliability of the entire composite optical element including the lens substrate.

The resin layer 13 is formed by polymerizing the resin composition. The resin composition contains the following components as essential components.

(A) (Meth)acrylate compound of saturated aliphatic epoxy compound
(B) Multifunctional isocyanurate compound
(C) Photopolymerization initiator When the resin composition is irradiated with an ultraviolet ray, the component (C), which is a photopolymerization initiator, initiates polymerization, and the resin composition containing the component (A), which is a (meth)acrylate compound of a saturated aliphatic epoxy compound, the component (B), which is a multifunctional isocyanurate compound, and the component (C), which is a photopolymerization initiator, is cured through polymerization to form the resin layer 13.

The resin composition may further contain the following components as optional components.

(D) Urethane acrylate
(E) Organosilane compound
(F) Fluorine compound

2-2. (Meth)Acrylate Compound of Saturated Aliphatic Epoxy Compound

The (meth)acrylate compound of a saturated aliphatic epoxy compound has a structure resulted from esterification by a reaction between the epoxy group of the saturated aliphatic epoxy compound and (meth)acrylic acid. It is preferable that the (meth)acrylate compound is a (meth)acrylate compound (di(meth)acrylate compound) having two (meth)acryloyl groups, from the viewpoint of curability of the composition.

Particularly preferably, the (meth)acrylate compound of a saturated aliphatic epoxy compound is a compound represented by a formula (1).

[Chemical Formula 1]

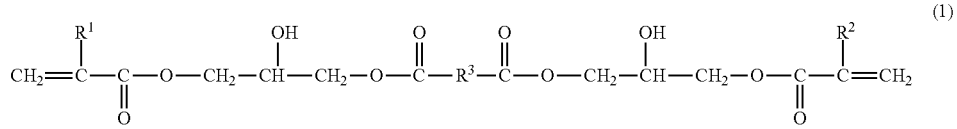

(1)

In the above-mentioned formula, $R^1$ and $R^2$ each denote a hydrogen atom or a methyl group, and $R^3$ denotes a saturated aliphatic hydrocarbon group. The saturated aliphatic hydrocarbon group denoted by $R^3$ may be any of linear, branched and cyclic groups, and preferably it is a linear group. Preferably, the number of carbon atoms of the saturated aliphatic hydrocarbon group is 1 to 25.

Examples of the compound represented by the formula (1) include compounds represented by the following formulae (2) to (17), but they are not limited to these.

[Chemical Formula 2]

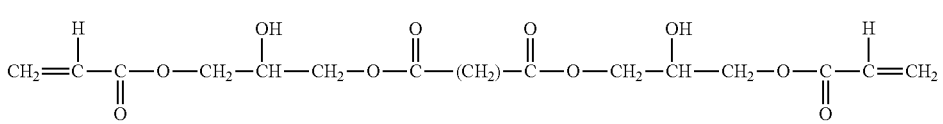

(2)

[Chemical formula 3]

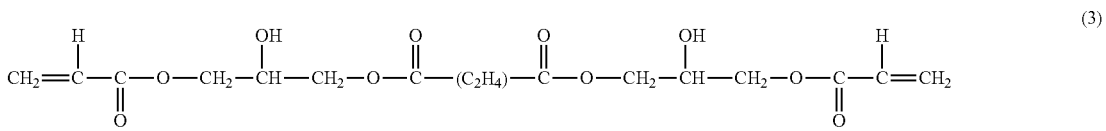

(3)

-continued
[Chemical formula 4]
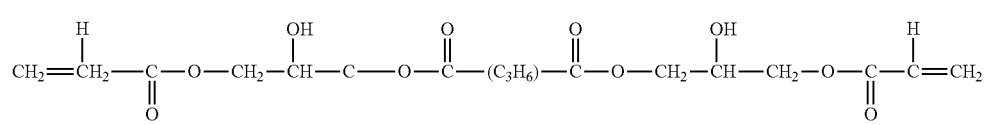
(4)
[Chemical formula 5]
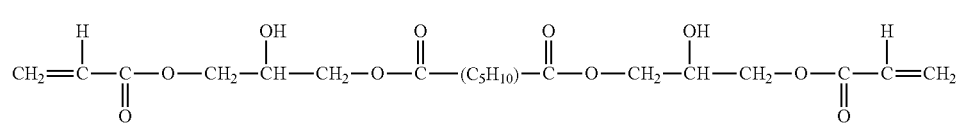
(5)
[Chemical formula 6]
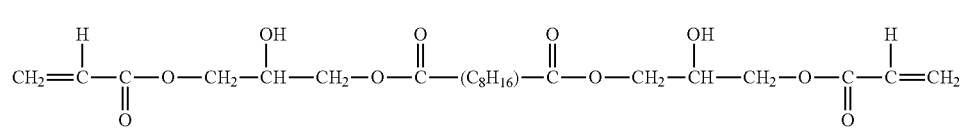
(6)
[Chemical formula 7]
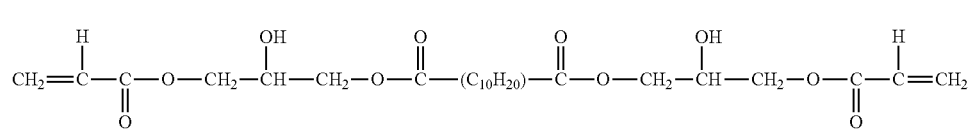
(7)
[Chemical formula 8]
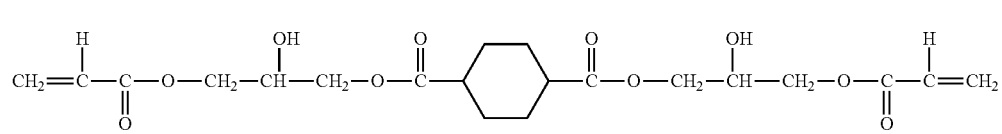
(8)
[Chemical formula 9]
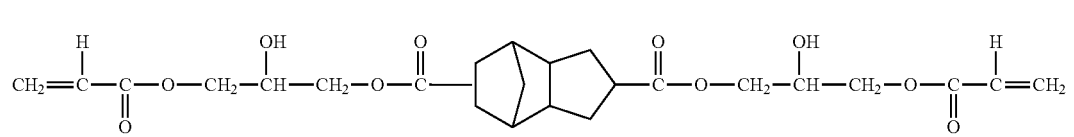
(9)
[Chemical formula 10]
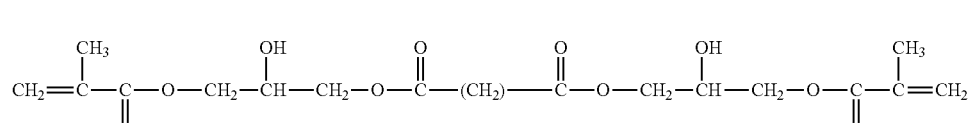
(10)
[Chemical formula 11]
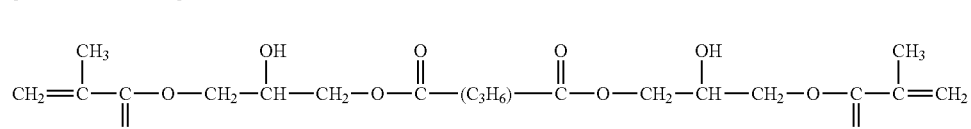
(11)
[Chemical formula 12]
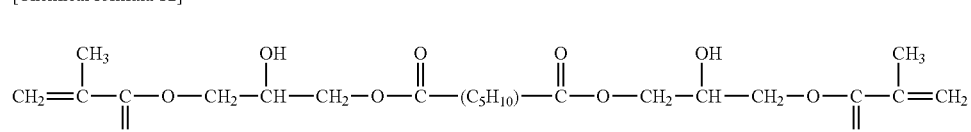
(12)
[Chemical formula 13]
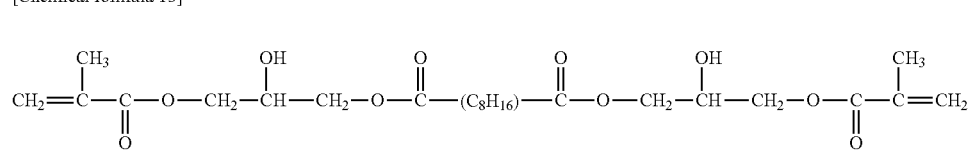
(13)

[Chemical formula 14]

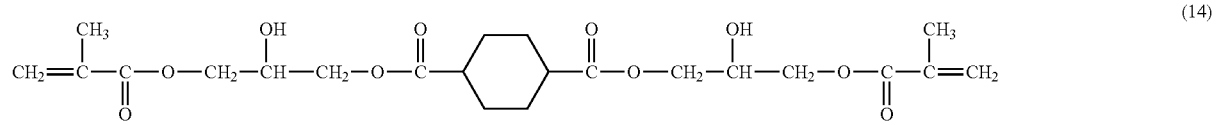
(14)

[Chemical formula 15]

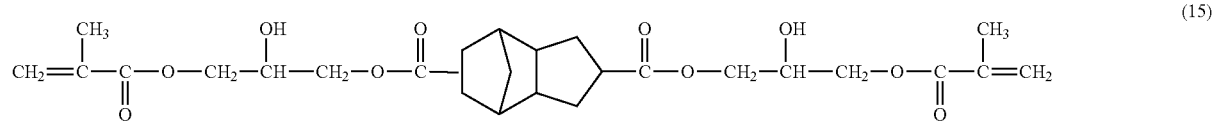
(15)

[Chemical formula 16]

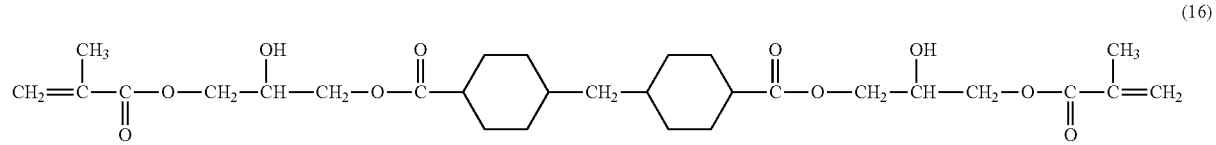
(16)

[Chemical formula 17]

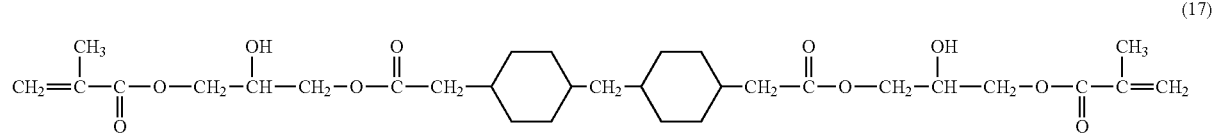
(17)

Two or more types of the components (A) may be used in combination. By mixing two or more types of the (meth)acrylate compounds having different properties, it is possible to control various properties (such as refractive index) required for the resin layer. Here, it is preferable that the resin composition contains at least a (meth)acrylate compound (such as compounds represented by the formulae (2) to (7) and (10) to (13)) in which $R^3$ is a linear saturated aliphatic hydrocarbon group. In the case of using two or more types of the components (A) for the resin composition, it is more preferable that the resin composition contains a (meth)acrylate compound in which $R^3$ is a linear saturated aliphatic hydrocarbon group, and a (meth)acrylate compound (such as compounds represented by formulae (8) to (9) and (14) to (17)) in which $R^3$ is a cyclic saturated aliphatic hydrocarbon group. Here, it is preferable that the weight ratio (linear:cyclic) between the (meth)acrylate compound in which $R^3$ is a linear saturated aliphatic hydrocarbon group and the (meth)acrylate compound in which $R^3$ is a cyclic saturated aliphatic hydrocarbon group is 1:1 to 9:1. When the content of the (meth)acrylate compound in which $R^3$ is a linear saturated aliphatic hydrocarbon group is lower than this ratio, the compatibility of each component of the resin composition may be reduced. On the other hand, when the content of the (meth)acrylate compound in which $R^3$ is a linear saturated aliphatic hydrocarbon group is higher than this ratio, the cure shrinkage ratio of the resin composition may be increased, causing the resin layer to separate from the optical substrate easily.

In the case where the component (A) is composed only of a (meth)acrylate compound (such as compounds represented by the formulae (2) to (7) and (10) to (13)) in which $R^3$ is a linear saturated aliphatic hydrocarbon group, the content of the component (A) preferably is at least 5 wt % but not higher than 70 wt % when the entire resin composition is taken as 100 wt %. When the content of the component (A) is higher than 70 wt %, the refractive index and viscosity of the resin composition may be lowered excessively. On the other hand, when the content of the component (A) is lower than 5 wt %, the shrinkage ratio of the resin layer may be increased, causing the resin layer to separate from the lens substrate easily.

2-3. (B) Multifunctional Isocyanurate Compound

As the component (B), a common multifunctional isocyanurate compound represented by the following formula (18) can be used, for example.

[Chemical formula 18]

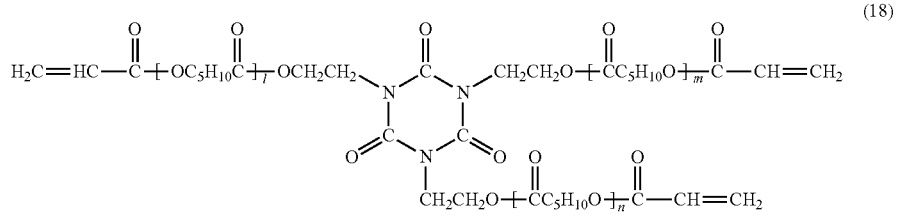
(18)

Specific examples thereof include compounds represented by the following formulae (19) to (21), but they are not limited to these.

[Chemical formula 19]

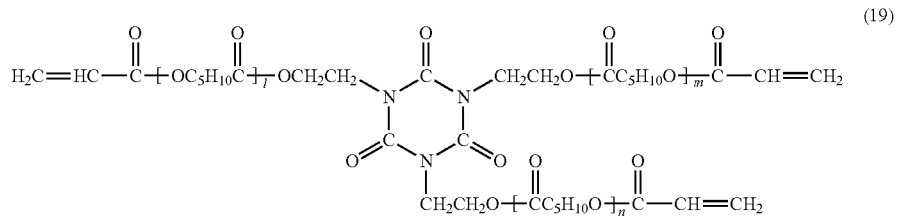

(19)

l + m + n = 1

[Chemical formula 20]

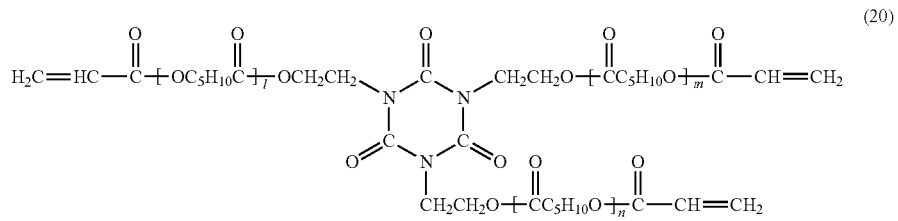

(20)

l + m + n = 2.2

[Chemical formula 21]

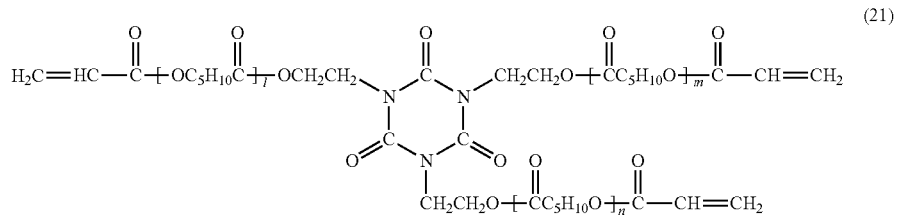

(21)

l + m + n = 0.9

Preferably, the weight ratio [(A)/(B)] of the component (A) to the component (B) is at least 1/9 but not higher than 3/2. When the weight ratio is higher than 3/2, the viscosity of the resin composition may be increased, making it difficult for the air bubbles contained therein to escape therefrom. On the other hand, when the weight ratio is lower than 1/9, the cure shrinkage ratio of the resin composition may be increased, causing the resin layer to separate easily.

2-4. (C) Photopolymerization Initiator

The type of the component (C) may be selected appropriately according to the types of the component (A) and the component (B). A radical photopolymerization initiator can be used suitably.

As the radical photopolymerization initiator, known ones can be used such as acetophenone, benzoin, benzophenone, thioxan and acylphosphine oxide radical photopolymerization initiators. The photopolymerization initiators can be used independently, or two or more of them can be used in combination.

Preferably, the content of the photopolymerization initiator is at least 0.1 wt % but not higher than 10 wt % when the entire resin composition is taken as 100 wt %. When the content of the photopolymerization initiator satisfies this range, it is possible to form the resin layer through stable polymerization-curing without deteriorating the properties and reliability of the resin composition.

2-5. (D) Urethane Acrylate

Addition of the component (D) to the resin composition can prevent further the yellowing of the resin layer and also enhance the weatherability of the resin layer. Accordingly, it is possible to enhance further both of the short-term reliability of the composite optical element during production and the long-term reliability of the composite optical element after production, with which yellowing is associated. As the component (D), common urethane acrylate represented by the following formula (22) can be used, for example.

[Chemical formula 22]

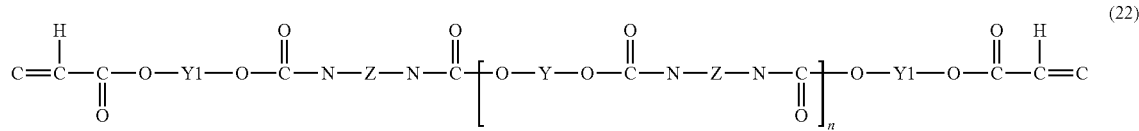

(22)

Here, n is an integer of 1 to 4. Y denotes —(CH$_2$)$_{2-6}$—, —CH$_2$CH(CH$_3$)—, —CH$_2$—CH(CH$_3$)—CH$_2$—, —CH$_2$—C$_6$H$_{10}$—CH$_2$—, —CH$_2$CH$_2$—(OCH$_2$CH$_2$)$_{1-15}$— or —(CH$_2$CH$_2$O)$_{1-15}$—C$_6$H$_4$—CH$_2$—C$_6$H$_4$—(OCH$_2$CH$_2$)$_{1-15}$—. Z denotes —(CH$_2$)$_6$—, —CH$_2$—C(CH$_3$)$_2$—CH$_2$—CH(CH$_3$)—CH$_2$CH$_2$— or —C(CH$_3$)$_2$—C$_6$H$_4$—C(CH$_3$)$_2$—. Y1 denotes —CH$_2$CH$_2$— or —CH$_2$—CH(CH$_3$)—.

Specific examples of the component (D) include compounds represented by the following formulae (23) and (24), but they are not limited to these.

[Chemical formula 23]

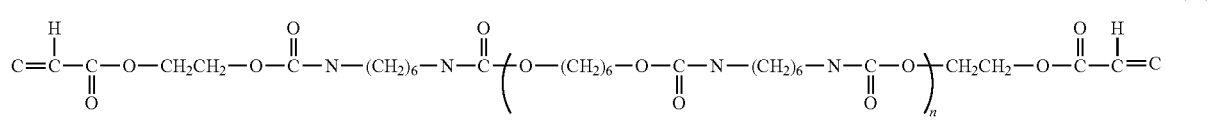

(23)

[Chemical formula 24]

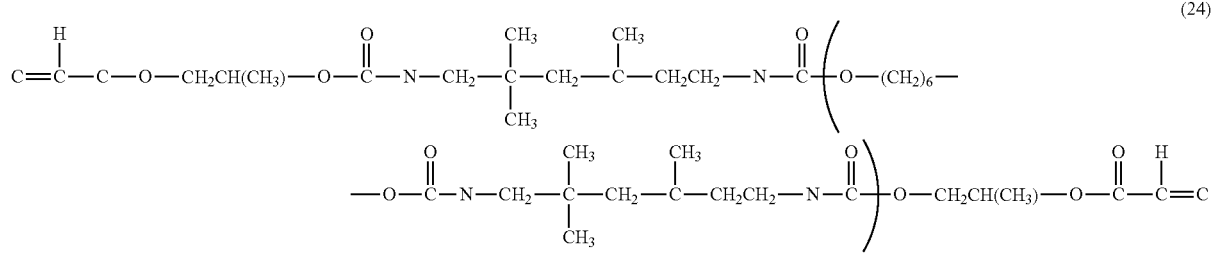

(24)

Since excessive addition of the component (D), urethane acrylate, increases the viscosity of resin composition, the content of the component (D), urethane acrylate, preferably is at least 1 wt % but not higher than 30 wt %, and more preferably at least 5 wt % but not higher than 15 wt %, when the entire resin composition is taken as 100 wt %.

2-6. (E) Organosilane Compound

Addition of the component (E) to the resin composition can enhance the adhesion between the resin layer and the optical substrate. As the component (E), there can be used, for example, 2-(3,4-epoxycyclohexyl)ethyltrimethoxysilane, 3-glycidoxypropyltrimethoxysilane, N-2-(aminoethyl)-3-aminopropylmethyldimethoxysilane, 3-acryloxypropyltrimethoxysilane, 3-ureidopropyltriethoxysilane, and 3-mercaptopropylmethyldimethoxysilane. The component (E) may be contained in the resin composition in advance. Alternatively, it is possible to allow the component (E) to be contained in the resin composition by applying the component (E) onto the optical substrate in advance, and bringing the applied component (E) into contact with a resin composition containing components other than the component (E).

2-7. (F) Fluorine Compound

Addition of the component (F) to the resin composition enhances the releasability of the resin layer from the mold. Examples of the component (F) include a fluorine-compound-based mold release agent such as methyl trifluoroacetate.

3. Production Method

Figure 2:
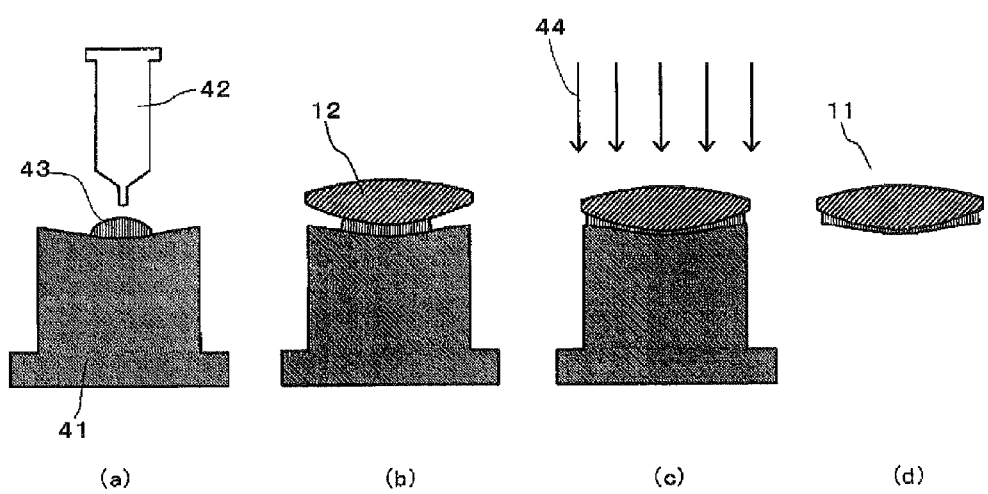
FIG. 2 is a cross-sectional view showing the outline of the process of producing the composite optical element of Embodiment 1.

Next, the method for producing the composite optical element will be described. The production method includes the steps of preparing a resin composition containing a (meth)acrylate compound of a saturated aliphatic epoxy compound, a multifunctional isocyanurate compound, and a photopolymerization initiator; and curing through polymerization the resin composition on a surface of an optical substrate. FIG. 2 shows the outline of the production method.

First, the step of preparing a resin composition is performed. Specifically, for example, the component (A), which is a (meth)acrylate compound of a saturated aliphatic epoxy compound, the component (B), which is a multifunctional isocyanurate compound, and the component (C), which is a photopolymerization initiator, are prepared. Then, these components are mixed together and degassed to prepare a resin composition 43.

Next, the step of curing through polymerization the resin composition on a surface of an optical substrate is performed. Specifically, for example, as shown in FIG. 2 (a), the resin composition 43 is dropped from a dispenser 42 onto a surface of a mold 41 that has a shape corresponding to a shape of a resin layer of the composite optical element. Next, as shown in FIG. 2(b), a lens substrate 12 is put on the resin composition and a load is applied from the upper side of the lens substrate so as to spread the resin composition 43. Thereafter, as shown in FIG. 2(c), an ultraviolet ray 44 is directed thereto with the lens substrate being set at a predetermined height relative to the mold 41, so that the resin composition is cured through polymerization. Through these steps, the composite optical element 11 in which the resin layer 13 is provided on the lens substrate 12 is obtained (FIG. 2 (d)).

Embodiment 2

The composite optical element of Embodiment 1 can be used for imaging devices such as cameras and video cameras, optical recording and reproducing devices, projectors, etc. in accordance with a publicly known method. The imaging devices including the composite optical element, the optical recording and reproducing devices including the composite optical element, and the projectors including the composite optical element have excellent reliability with which yellowing is associated. Furthermore, the fact that the composite optical element can be aspherical allows these devices to have enhanced optical properties and reduced weights.

EXAMPLES

Hereinafter, the present invention will be described in detail with reference to Examples and Comparative Example, but the present invention is not limited to these Examples.

Regarding each Example and Comparative Example, Table 1 shows the composition of the resin composition, compatibility of each component of the resin composition, bubble generation status during the preparation of the resin composition and the formation of the resin layer, yellowing status during the formation of the resin layer, shrinkage ratio at the time of the polymerization-curing, and separation status of the resin layer.

The shrinkage ratio at the time of the polymerization-curing was calculated using the values of the specific gravities respectively measured before and after the polymerization-curing with ultraviolet ray irradiation (3000 mJ/cm$^2$). Specifically, the shrinkage ratio is an amount of change, expressed in %, from the specific gravity measured before the polymerization-curing.

The resin composition was applied onto the mold 41 and irradiated with an ultraviolet ray (3000 mJ/cm$^2$), with the lens being retained at a predetermined position, to form a resin layer. The separation status of the formed resin layer was checked. According to the evaluation criteria, "◯" indicates that no separation was observed, and "X" indicates that separation was observed.

Further, the resin composition was irradiated with the same ultraviolet ray for 300 seconds to perform an accelerated test with the ultraviolet ray irradiation, and the resin layer was observed for degree of coloring on its appearance. According to the evaluation criteria, "not observed" means that no yellowing occurred, and "yellowing observed" means that yellowing occurred.

As for the bubble generation status, the state of the resin composition in the processes until and during the formation of the resin layer and the state after the formation of the resin layer were checked. According to the evaluation criteria, "not observed" indicates that no air bubbles were present in the resin layer, "many air bubbles generated" indicates that many air bubbles were generated after the mixing of the resin composition, and "air bubbles not removable" indicates that many air bubbles were generated after the mixing of the resin composition and they could not be removed.

As for the compatibility, it was checked whether all of the components of the resin composition were mixed together successfully without being separated or remaining. According to the evaluation criteria, "◯" indicates that the mixing was successful, and "X" indicates that the mixing was unsuccessful.

Example 1

In the present example, all of the following components (A), (B) and (C) were mixed together first to obtain a resin composition.
(A) Epoxy(meth)acrylate [Formula (5)], 50 parts by weight
(B) Multifunctional isocyanurate compound B [Formula (19)], 45 parts by weight
(C) Photopolymerization initiator A (1-hydroxycyclohexyl phenyl ketone), 5 parts by weight As shown in FIG. 2, the lens substrate was put on this resin composition. Irradiation with ultraviolet rays allowed the photopolymerization initiator to initiate polymerization of the components (A) and (B), and the components (A), (B) and (C) were cured through polymerization on the lens substrate to form a resin layer. Thus, the composite optical element of Example 1 having the structure shown in FIG. 1 was produced.

In the present example, the shrinkage ratio at the time of the polymerization-curing measured 5.0%. No separation of the resin layer was observed in the produced composite optical element. Moreover, no yellowing was observed in the resin layer, either.

Example 2

In the present example, the types and parts by weight of the components (B) and (C) were the same as in Example 1, and thus the descriptions thereof are omitted. The difference from Example 1 was as follows.
(A) Epoxy(meth)acrylate [Formula (6)], 50 parts by weight In the present example, the components (A), (B) and (C) were mixed together to obtain a resin composition. The lens substrate was put on this resin composition. Irradiation with ultraviolet rays allowed the photopolymerization initiator to initiate polymerization of the components (A) and (B), and the components (A), (B) and (C) were cured through polymerization on the lens substrate to form a resin layer. Thus, the composite optical element of Example 2 was produced.

In the present example, the shrinkage ratio at the time of the polymerization-curing measured 4.5%. No separation of the resin layer was observed in the produced composite optical element. Moreover, no yellowing was observed in the resin layer, either.

Example 3

In the present example, the types and parts by weight of the components (B) and (C) were the same as in Example 1, and thus the descriptions thereof are omitted. The difference from Example 1 was as follows.
(A) Epoxy(meth)acrylate [Formula (3)], 25 parts by weight
Epoxy(meth)acrylate [Formula (7)], 25 parts by weight In the present example, the components (A), (B) and (C) were mixed together to obtain a resin composition. The lens substrate was put on this resin composition. Irradiation with ultraviolet rays allowed the photopolymerization initiator to initiate polymerization of the components (A) and (B), and the components (A), (B) and (C) were cured through polymerization on the lens substrate to form a resin layer. Thus, the composite optical element of Example 3 was produced.

In the present example, the shrinkage ratio at the time of the polymerization-curing measured 4.8%. No separation of the resin layer was observed in the produced composite optical element. Moreover, no yellowing was observed in the resin layer, either.

Example 4

In the present example, the types and parts by weight of the components (B) and (C) were the same as in Example 1, and thus the descriptions thereof are omitted. The difference from Example 1 was as follows.
(A) Epoxy(meth)acrylate [Formula (4)], 25 parts by weight
Epoxy(meth)acrylate [Formula (8)], 25 parts by weight In the present example, the components (A), (B) and (C) were mixed together to obtain a resin composition. The lens substrate was put on this resin composition. Irradiation with ultraviolet rays allowed the photopolymerization initiator to initiate polymerization of the components (A) and (B), and the components (A), (B) and (C) were cured through polymerization on the lens substrate to form a resin layer. Thus, the composite optical element of Example 4 was produced.

In the present example, the shrinkage ratio at the time of the polymerization-curing measured 5.7%. No separation of the resin layer was observed in the produced composite optical element. Moreover, no yellowing was observed in the resin layer, either.

Example 5

In the present example, the type and parts by weight of the component (C) were the same as in Example 1, and thus the descriptions thereof are omitted. The difference from Example 1 was as follows.
(A) Epoxy(meth)acrylate [Formula (5)], 9.5 parts by weight
(B) Multifunctional isocyanurate compound [Formula (21)], 85.5 parts by weight In the present example, the components (A), (B) and (C) were mixed together to obtain a resin composition. The lens substrate was put on this resin composition. Irradiation with ultraviolet rays allowed the photopolymerization initiator to initiate polymerization of the components (A) and (B), and the components (A), (B) and (C) were cured through polymerization on the lens substrate to form a resin layer. Thus, the composite optical element of Example 5 was produced.

In the present example, the shrinkage ratio at the time of the polymerization-curing measured 6.0%. No separation of the resin layer was observed in the produced composite optical element. Moreover, no yellowing was observed in the resin layer, either.

Example 6

In the present example, the type and parts by weight of the component (C) were the same as in Example 1, and thus the descriptions thereof are omitted. The difference from Example 1 was as follows.
(A) Epoxy(meth)acrylate [Formula (5)], 40 parts by weight
(B) Multifunctional isocyanurate compound [Formula (19)], 45 parts by weight
(D) Urethane acrylate [Formula (23)], 10 parts by weight In the present example, the components (A), (B), (C) and (D) were mixed together to obtain a resin composition. The lens substrate was put on this resin composition. Irradiation with ultraviolet rays allowed the photopolymerization initiator to initiate polymerization of the components (A), (B) and (D), and the components (A), (B), (C) and (D) were cured through polymerization on the lens substrate to form a resin layer. Thus, the composite optical element of Example 6 was produced.

In the present example, the shrinkage ratio at the time of the polymerization-curing measured 5.3%. No separation of the resin layer was observed in the produced composite optical element. Moreover, no yellowing was observed in the resin layer, either.

Example 7

In the present example, the type and parts by weight of the component (C) were the same as in Example 1, and thus the descriptions thereof are omitted. The difference from Example 1 was as follows.
(A) Epoxy(meth)acrylate [Formula (5)], 40 parts by weight
(B) Multifunctional isocyanurate compound [Formula (19)], 45 parts by weight
(D) Urethane acrylate [Formula (23)], 10 parts by weight In the present example, the components (A), (B), (C) and (D) were mixed together to obtain a resin composition. The lens substrate was put on this resin composition. Irradiation with ultraviolet rays allowed the photopolymerization initiator to initiate polymerization of the components (A), (B) and (D), and the components (A), (B), (C) and (D) were cured through polymerization on the lens substrate to form a resin layer. Thus, the composite optical element of Example 7 was produced.

In the present example, the shrinkage ratio at the time of the polymerization-curing measured 5.8%. No separation of the resin layer was observed in the produced composite optical element. Moreover, no yellowing was observed in the resin layer, either.

Example 8

In the present example, the type and parts by weight of the component (C) were the same as in Example 1, and thus the descriptions thereof are omitted. The difference from Example 1 was as follows.
(A) Epoxy(meth)acrylate compound [Formula (5)], 45 parts by weight
(B) Multifunctional isocyanurate compound [Formula (19)], 44 parts by weight
(E) 3-glycidoxypropyltrimethoxysilane, 3 parts by weight
(F) Methyl trifluoroacetate, 3 parts by weight In the present example, the components (A), (B), (C), (E) and (F) were mixed together to obtain a resin composition. The lens substrate was put on this resin composition. Irradiation with ultraviolet rays allowed the photopolymerization initiator to initiate polymerization of the components (A) and (B), and the components (A), (B), (C), (E) and (F) were cured through polymerization on the lens substrate to form a resin layer. Thus, the composite optical element of Example 8 was produced.

In the present example, the shrinkage ratio at the time of the polymerization-curing measured 5.0%. No separation of the resin layer was observed in the produced composite optical element. Moreover, no yellowing was observed in the resin layer, either.

Example 9

In the present example, the types and parts by weight of the components (B) and (C) were the same as in Example 1, and thus the descriptions thereof are omitted. The difference from Example 1 was as follows.
(A) Epoxy(meth)acrylate [Formula (4)], 45 parts by weight
Epoxy(meth)acrylate [Formula (8)], 5 parts by weight
In the present example, the components (A), (B) and (C) were mixed together to obtain a resin composition. The lens substrate was put on this resin composition. Irradiation with ultraviolet rays allowed the photopolymerization initiator to initiate polymerization of the components (A) and (B), and the components (A), (B) and (C) were cured through polymerization on the lens substrate to form a resin layer. Thus, the composite optical element of Example 9 was produced.

In the present example, the shrinkage ratio at the time of the polymerization-curing measured 5.8%. No separation of the resin layer was observed in the produced composite optical element. Moreover, no yellowing was observed in the resin layer, either.

Example 10

In the present example, the type and parts by weight of the component (C) were the same as in Example 1, and thus the descriptions thereof are omitted. The difference from Example 1 was as follows.
(A) Epoxy(meth)acrylate [Formula (2)], 9.5 parts by weight
(B) Multifunctional isocyanurate compound [Formula (19)], 85.5 parts by weight
In the present example, the components (A), (B) and (C) were mixed together to obtain a resin composition. The lens substrate was put on this resin composition. Irradiation with ultraviolet rays allowed the photopolymerization initiator to initiate polymerization of the components (A) and (B), and the components (A), (B) and (C) were cured through polymerization on the lens substrate to form a resin layer. Thus, the composite optical element of Example 10 was produced.

In the present example, the shrinkage ratio at the time of the polymerization-curing measured 6.8%. No separation of the resin layer was observed in the produced composite optical element. Moreover, no yellowing was observed in the resin layer, either.

Example 11

In the present example, the type and parts by weight of the component (C) were the same as in Example 1, and thus the descriptions thereof are omitted. The difference from Example 1 was as follows.
(A) Epoxy(meth)acrylate [Formula (2)], 57 parts by weight
(B) Multifunctional isocyanurate compound [Formula (19)], 38 parts by weight
In the present example, the components (A), (B) and (C) were mixed together to obtain a resin composition. The lens substrate was put on this resin composition. Irradiation with ultraviolet rays allowed the photopolymerization initiator to initiate polymerization of the components (A) and (B), and the components (A), (B) and (C) were cured through polymerization on the lens substrate to form a resin layer. Thus, the composite optical element of Example 11 was produced.

In the present example, the shrinkage ratio at the time of the polymerization-curing measured 5.7%. No separation of the resin layer was observed in the produced composite optical element. Moreover, no yellowing was observed in the resin layer, either.

Example 12

In the present example, the type and parts by weight of the component (C) were the same as in Example 1, and thus the descriptions thereof are omitted. The difference from Example 1 was as follows.
(A) Epoxy(meth)acrylate [Formula (17)], 9.5 parts by weight
(B) Multifunctional isocyanurate compound [Formula (21)], 85.5 parts by weight
In the present example, the components (A), (B) and (C) were mixed together to obtain a resin composition. The lens substrate was put on this resin composition. Irradiation with ultraviolet rays allowed the photopolymerization initiator to initiate polymerization of the components (A) and (B), and the components (A), (B) and (C) were cured through polymerization on the lens substrate to form a resin layer. Thus, the composite optical element of Example 12 was produced.

In the present example, the shrinkage ratio at the time of the polymerization-curing measured 5.9%. No separation of the resin layer was observed in the produced composite optical element. Moreover, no yellowing was observed in the resin layer, either.

Comparative Example 1

In the present example, the type and parts by weight of the component (C) were the same as in Example 1, and thus the descriptions thereof are omitted. The difference from Example 1 was as follows.
(A') Epoxy acrylate [Formula (25)], 9.5 parts by weight
(B) Multifunctional isocyanurate compound [Formula (21)], 85.5 parts by weight

[Chemical formula 25]

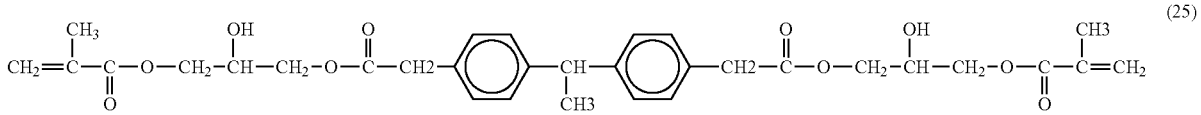

In the present example, the components (A'), (B) and (C) were mixed together to obtain a resin composition. The lens substrate was put on this resin composition. Irradiation with ultraviolet rays allowed the photopolymerization initiator to initiate polymerization of the components (A') and (B), and the components (A'), (B) and (C) were cured through polymerization on the lens substrate to form a resin layer. Thus, the composite optical element of Comparative Example 1 was produced.

In the present comparative example, the shrinkage ratio at the time of the polymerization-curing measured 6.0%. Although no separation of the resin layer was observed in the produced composite optical element, yellowing was observed.

The above-mentioned Examples and Comparative Example revealed the following.

(1) In the case where the resin composition contained aromatic epoxy(meth)acrylate as in Comparative Example 1, the resin layer suffered yellowing, whereas in the case where the resin composition contained a (meth)acrylate compound of a saturated aliphatic epoxy compound as in Examples 1 to 12, the yellowing of the resin layer was prevented. Particularly in Examples 1 to 12, it was possible to enhance both of the long-term reliability of the lens after molding and the short-term reliability of the lens during production, with which yellowing is associated.

Therefore, it has been found that in the composite optical element including the resin layer obtained by polymerizing the resin composition containing a (meth)acrylate compound of a saturated aliphatic epoxy compound, a multifunctional isocyanurate compound, and a photopolymerization initiator, the yellowing of the resin layer can be prevented.

(2) Also in the case where the resin composition contained two types of (meth)acrylate compounds as in Example 3, each component of the resin composition had satisfactory compatibility, and yellowing of the resin layer after the polymerization-curing of the resin composition was prevented as in Example 1 containing only one type of the (meth)acrylate compound. Accordingly, it was possible to enhance both of the long-term reliability of the lens after molding and the short-term reliability of the lens during production, with which yellowing is associated.

As a result, it has been found that the yellowing of the resin layer can be prevented also in the composite optical element produced using the resin composition containing two or more types of the (meth)acrylate compounds. Therefore, it is possible to control the properties of the composite optical element by using two or more types of the (meth)acrylate compounds having different properties from each other.

(3) In the case where urethane acrylate was used as a component of the resin composition as in Examples 6 and 7, the yellowing of the resin layer was prevented as in Example 1. Accordingly, it was possible to enhance both of the long-term reliability of the lens after molding and the short-term reliability of the lens during production, with which yellowing is associated.

That is, it has been found that the yellowing of the resin layer can be prevented also in the composite optical element produced using the resin composition further containing urethane acrylate. Urethane acrylate is a component capable of preventing yellowing, thereby preventing further the yellowing of the resin layer.

(4) In the case where a silane compound and a fluorine compound were used as components of the resin composition as in Example 8, it was possible to enhance the adhesion between the glass lens substrate and the resin layer and to increase the releasability of the resin layer from the mold.

That is, in the composite optical element produced using the resin composition further containing an organosilane compound, the adhesion between the lens substrate and the resin layer is enhanced and the separation of the resin layer from the lens substrate can be prevented. In the case of the composite optical element produced using the resin composition further containing a fluorine compound, the resin layer formed as a result of the polymerization-curing can be taken out of the mold easily.

In forming the resin layer into an aspherical shape, the thickness of the resin layer varies with location. Here, there is a problem in that when a portion of the resin layer with a small thickness is referred to as a and a portion of the resin layer with a large thickness is referred to as b, an increase in the ratio of b to a (thickness deviation ratio b/a) causes the resin layer to separate from the lens substrate easily. However, in the composite optical element produced using the resin composition further containing an organosilane compound, the separation of the resin layer can be prevented even when the thickness deviation ratio is increased.

TABLE 1

| | Saturated aliphatic group denoted by $R^3$ | | | Multifunctional isocyanurate compound | Urethane compound | Organosilane compound | Fluorine compound |
|---|---|---|---|---|---|---|---|
| | Linear | Linear | Cyclic | | | | |
| Example 1 | 50 | — | — | 45 | | | |
| Example 2 | 50 | — | — | | | | |
| Example 3 | 25 | 25 | — | | | | |
| Example 4 | 25 | — | 25 | | | | |
| Example 5 | 9.5 | — | — | 85.5 | | | |
| Example 6 | 40 | — | — | 45 | 10 | | |
| Example 7 | 40 | — | — | | 10 | | |
| Example 8 | 45 | — | — | 44 | | 3 | 3 |
| Example 9 | 45 | — | 5.0 | 45 | | | |
| Example 10 | 9.5 | — | — | 85.5 | | | |
| Example 11 | 57 | — | — | 38 | | | |
| Example 12 | — | — | 9.5 | 85.5 | | | |
| C. Example 1 | — | — | 9.5 (Aromatic ring) | | | | |

| | Photopolymerization initiator | Compatibility | Bubble generation status | Yellowing status | Shrinkage ratio (%) | Separation status |
|---|---|---|---|---|---|---|
| Example 1 | 5 | ○ | Not observed | Not observed | 5.0 | ○ |
| Example 2 | | ○ | Not observed | Not observed | 4.5 | ○ |
| Example 3 | | ○ | Not observed | Not observed | 4.8 | ○ |
| Example 4 | | ○ | Not observed | Not observed | 5.7 | ○ |
| Example 5 | | ○ | Not observed | Not observed | 6.0 | ○ |
| Example 6 | | ○ | Not observed | Not observed | 5.3 | ○ |
| Example 7 | | ○ | Not observed | Not observed | 5.8 | ○ |

TABLE 1-continued

| | | | | | |
|---|---|---|---|---|---|
| Example 8 | ○ | Not observed | Not observed | 5.0 | ○ |
| Example 9 | ○ | Not observed | Not observed | 5.8 | ○ |
| Example 10 | ○ | Not observed | Not observed | 6.8 | ○ |
| Example 11 | ○ | Not observed | Not observed | 5.7 | ○ |
| Example 12 | ○ | Not observed | Not observed | 5.9 | ○ |
| C. Example 1 | ○ | Not observed | Yellowing observed | 6.0 | ○ |

INDUSTRIAL APPLICABILITY

The composite optical element of the present invention can be used for lenses for cameras and video cameras, lenses for projectors, lenses for optical discs (CD and DVD), etc.

The invention claimed is:

1. A composite optical element comprising a resin layer obtained by polymerizing a resin composition containing
    a (meth)acrylate compound of a saturated aliphatic epoxy compound,
    a multifunctional isocyanurate compound, and
    a photopolymerization initiator,
    wherein the (meth)acrylate compound is a compound represented by a formula:

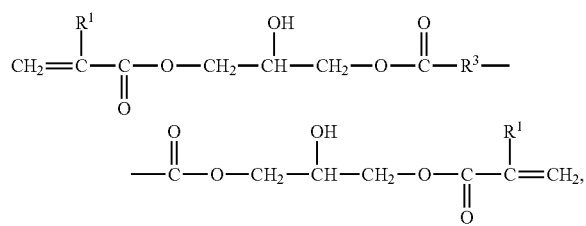

where $R^1$ and $R^2$ each denote a hydrogen atom or a methyl group, and $R^3$ denotes a saturated aliphatic hydrocarbon group, wherein the multifunctional isocyanurate compound is a compound represented by a formula:

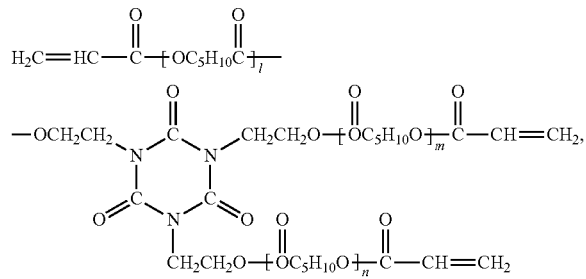

where $l+m+n=1$, 0.9 or 2.2.

2. The composite optical element according to claim 1, wherein the $R^3$ is a linear saturated aliphatic hydrocarbon group.

3. The composite optical element according to claim 1, wherein the resin composition contains two or more types of the (meth)acrylate compounds.

4. The composite optical element according to claim 1, wherein the resin composition contains a (meth)acrylate compound in which $R^3$ in the formula (1) is a linear saturated aliphatic hydrocarbon group, and a (meth)acrylate compound in which $R^3$ in the formula (1) is a cyclic saturated aliphatic hydrocarbon group.

5. The composite optical element according to claim 1, wherein the resin composition further contains urethane acrylate.

6. The composite optical element according to claim 1, wherein the resin composition further contains an organosilane compound.

7. The composite optical element according to claim 1, wherein the resin composition further contains a fluorine compound.

8. The composite optical element according to claim 1, comprising the resin layer, and an optical substrate with the resin layer being formed on an upper surface thereof.

9. The composite optical element according to claim 8, wherein the optical substrate has a thickness of at least 1 mm but not more than 30 mm, and the surface of the optical substrate on which the resin layer is formed has a curvature radius of at least 3 mm but not more than 100 mm.

10. The composite optical element according to claim 1, wherein the resin layer has a thickness of at least 50 μm but not more than 2000 μm, and the thickness varies with location.

11. An imaging device comprising the composite optical element according to claim 1.

12. An optical recording and reproducing device comprising the composite optical element according to claim 1.

13. A composite optical element comprising a resin layer obtained by polymerizing a resin composition containing
    a (meth)acrylate compound of a saturated aliphatic epoxy compound,
    a multifunctional isocyanurate compound, and
    a photopolymerization initiator,
    wherein the (meth)acrylate compound is a compound represented by a formula:

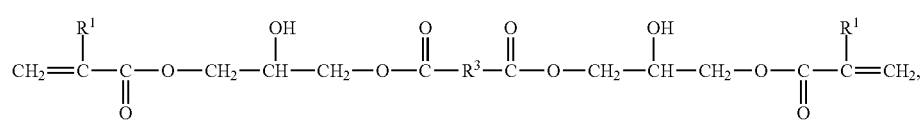

where $R^1$ and $R^2$ each denote a hydrogen atom or a methyl group, and $R^3$ denotes a saturated aliphatic hydrocarbon group,
wherein the multifunctional isocyanurate compound is a compound represented by a formula:
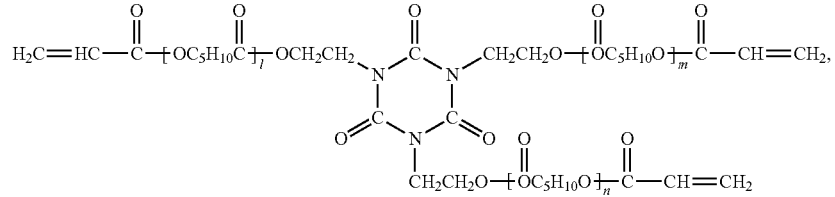
where $l+m+n=0.9$.
* * * * *